Jan. 16, 1951 L. H. EASLICK Re. 23,328
RESILIENT EXPANSIBLE BUCKLE-MOUNTING
Original Filed Sept. 22, 1948 2 Sheets-Sheet 1
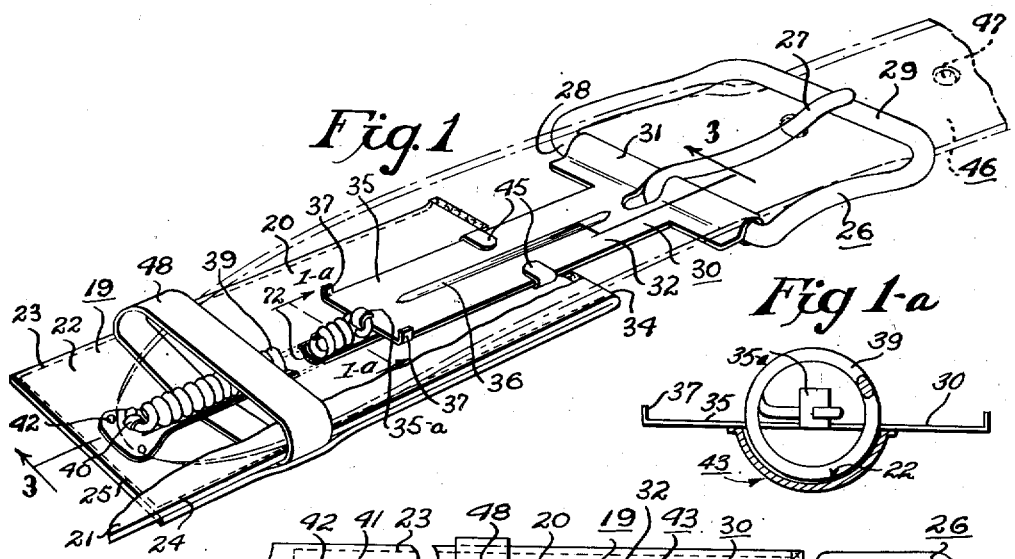
INVENTOR.
Lloyd H. Easlick
BY
Leonard L. Kalish
Attorney

RESILIENT EXPANSIBLE BUCKLE-MOUNTING

Original Filed Sept. 22, 1948 2 Sheets-Sheet 2

INVENTOR.
Lloyd H. Easlick
BY
Leonard L. Kalish
Attorney

Reissued Jan. 16, 1951

Re. 23,328

UNITED STATES PATENT OFFICE 23,328

RESILIENT EXPANSIBLE BUCKLE MOUNTING

Lloyd H. Easlick, Flourtown, Pa., assignor to Pioneer Suspender Company, Philadelphia, Pa., a corporation of Pennsylvania Original No. 2,486,356, dated October 25, 1949, Serial No. 50,592, September 22, 1948. Application for reissue July 25, 1950, Serial No. 175,831

12 Claims. (Cl. 2—322)

Matter enclosed in heavy brackets [ ] appears in the original patent but forms no part of this reissue specification; matter printed in italics indicates the additions made by reissue The present invention relates to trouser belts and similar fastening and supporting members for clothing and it relates more particularly to trouser belt constructions wherein the buckle is made resiliently movable relative to the belt to provide greater comfort for the wearer.

An object of the present invention is to provide a new and improved construction for trouser belts and like fastening and supporting members for clothing. Another object of the present invention is to provide a neat, comfortable, inexpensive, dependable and long-lasting construction for a trouser belt or the like wherein the buckle or similar fastening element is made resiliently movable relative to the belt.

Other objects and advantages of the present invention are apparent in the following detailed description, appended claims and accompanying drawings.

It has heretofore been proposed to provide a trouser belt construction wherein the buckle is made resiliently movable relative to the belt so that there is a slight "give" or expansibility to the belt, when worn, thereby providing a greater degree of comfort than is possible with non-resilient belt constructions.

However, none of these prior belt constructions has proved entirely satisfactory since all of them have been relatively complicated and difficult to assemble and install and have tended to fail upon prolonged use due to inherent shortcomings in the structure.

In my co-pending applications Serial No. 18,398, filed April 1, 1948, and Serial 39,444, filed July 19, 1948, now abandoned, of which the present application is a continuation-in-part, I have disclosed a resilient mounting for a belt-buckle or the like wherein the buckle is pivotally carried by a connector having an elongated, thin, flat shank passing through a slot formed through a folded, looped end of the belt (which is of flexible but non-resilient material such as leather, synthetic plastic or fabric), the inner end of the shank being connected to a spring tensioning it inwardly; a stop-member of metal or the like being immovably secured relative to the fold or loop of the belt generally adjacent the slot so as to limit the outward movement of the connector and buckle. In the embodiments of my co-pending application Serial No. 18,398, the stop-member is provided with bent-over ears which cooperate with stop-shoulders formed at the inner end of the thin flat shank so as to limit the outward movement of the shank. In the embodiments of my co-pending application Serial No. 39,444, the stop-member is provided with a stem-portion which extends through a longitudinal slot in the shank of the connector so as to limit its movement relative to the belt.

In the forms of both of my co-pending applications Serial Nos. 18,398 and 39,444, the stop-member is formed as a separate and distinct element which must be fastened to the belt adjacent the fold-line as one of the several assembly operations.

According to the present invention, I have developed a further-improved construction wherein the stop-member (which may take any of the forms of my aforesaid co-pending applications) permanently attached to and carried by the attachment-plate which anchors the spring to the belt whereby the buckle and connector parts can be pre-assembled as a more or less unitary element which can be quickly and easily installed upon the belt with only a single fastening operation.

The present invention further contemplates a construction wherein a simple and inexpensive shield is provided intermediate the helical spring and at least one of the panels of the belt loop so as to reduce friction or "binding" and thereby to insure smoother and easier operation of the buckle and connector during use.

For the purpose of illustrating the invention, there are shown in the accompanying drawings forms thereof which are at present preferred, although it is to be understood that the various instrumentalities of which the invention consists can be variously arranged and organized and that the invention is not limited to the precise arrangements and organizations of the instrumentalities as herein shown and described.

Referring to the accompanying drawing in which like reference characters indicate like parts throughout:

Figure 1 represents a fragmentary perspective view of one embodiment of the present invention with the buckle in partially-extended position, parts being broken away better to reveal the construction thereof.

Figure 1-a represents a cross-sectional view taken on an enlarged scale generally along the line 1-a—1-a of Figure 1.

Figure 2 represents an elevational view, on a somewhat reduced scale, showing the inner or underside of the embodiment of Figure 1, but with the buckle shown in fully-retracted position; parts being broken away better to reveal the construction thereof.

Figure 3 represents a cross-sectional view taken generally along the line 3—3 of Figure 1 but with the buckle shown in fully-extended position.

Figure 4 represents a cross-sectional view generally along the line 4—4 of Figure 3.

Figure 5 represents an elevational view, on a further reduced scale, of a buckle and connector assembly showing the top or outer side thereof, as a more or less unitary element ready for installation upon a belt.

Figure 6 represents an elevational view of a buckle and connector unit showing the inner or underside thereof.

Figure 6-a represents a cross-sectional view taken generally along the line 6-a—6-a of Figure 6.

Figure 7:
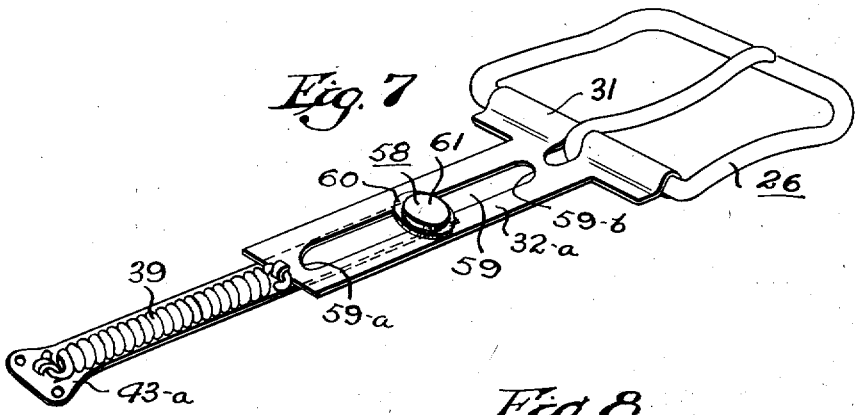

Figure 7 represents a perspective view generally like that of Figure 1 showing another embodiment of the present invention.

Figure 8:
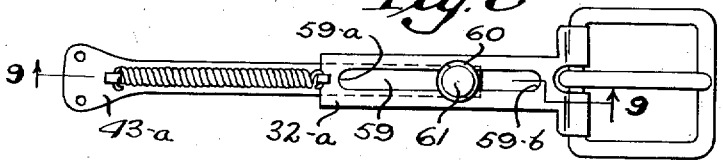

Figure 8 represents an elevational view showing the upper or outer side of the connector unit of Figure 7.

Figure 9:
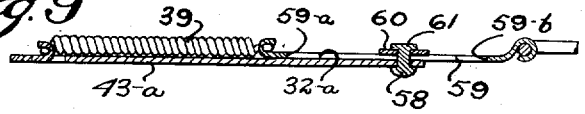

Figure 9 represents a cross-sectional view generally along the line 9—9 of Figure 8.

Figure 10:
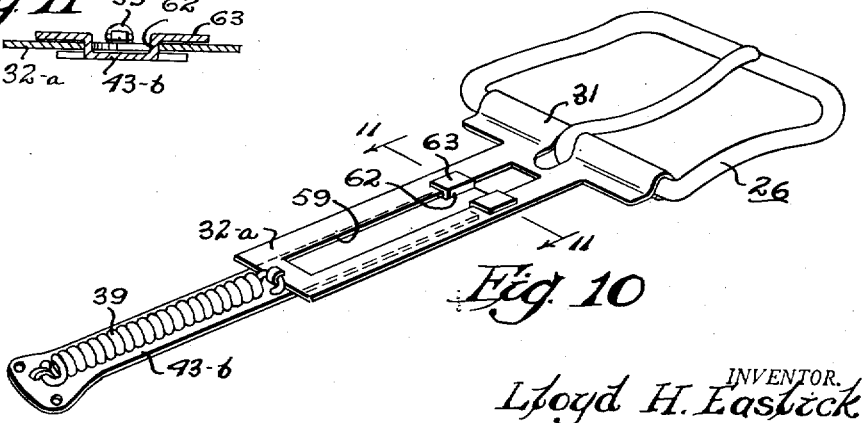

Figure 10 represents a fragmentary perspective view showing a modified form of the embodiment of Figures 7–9.

Figure 11:
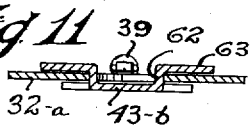

Figure 11 represents a cross-sectional view generally along line 11—11 of Figure 10.

In one embodiment of the present invention shown generally in Figures 1–5, I may provide a trouser-belt including an elongated strap or belt 19 of leather or fabric or synthetic plastic or other flexible but relatively non-resilient material, one end of which is folded back upon itself to provide a generally enclosed loop or pocket or compartment 20 having a front panel 21 and a rear panel 22 which are sewn together at their upper and lower edges by rows of stitching 23 and 24; a transverse row of stitching 25 closing the end of the loop or compartment generally adjacent the free edge of the rear panel 22.

A buckle 26 of generally conventional construction, including a tongue 27 rotatably mounted upon the rear bar or bridge 28 and adapted to bear, with its free end, against the front bar 29 of the buckle 26, is constructed and arranged to be mounted exteriorly of the loop 20 in a manner to be more fully described hereinbelow.

The buckle 26 is rotatably held by one end of a connector member 30 which includes a pair of laterally-spaced curved sleeves 31 constructed and arranged to embrace the rear bar or bridge 28 (on either side of the tongue 27) so as to permit the buckle to pivot relative to the connector member 30.

The connector member, which is preferably integrally formed of metal or the like, also includes a thin flat elongated shank 32 which extends in continuation of the sleeves 31 and passes through a thin transverse slot or opening 33 formed in the central portion of the fold-line 34 of the loop or compartment 20 with its inner free end 35 terminating inside the loop or compartment 20 which, as indicated particularly in Figure 4, is bulged slightly intermediate the stitching 23 and 24 to provide an inner compartment to receive the shank 32.

The shank 32 (which, as indicated particularly in Figures 1, 2 and 4, has a transverse dimension somewhat less than that of the slot 33, so that it can be inserted into the loop through said slot) may be provided with a longitudinally-extending strengthening rib 36 pressed outward therefrom to provide greater rigidity and resistance to bending or twisting.

The inner end 35 of the shank 32 is provided with a pair of integrally-formed forwardly or outwardly bent stop shoulders 37 which served to increase the thickness or front-to-rear dimension of the end 35 without enlarging the transverse dimension, as indicated in Figures 1 and 2 and 5.

The inner end 35 is also provided with an integrally-formed central loop 35-a to which one end of a helical spring 39 is connected.

The other end of the spring 39 is connected to a loop 40 formed at the enlarged rear-end 41 of an elongated generally flat rigid anchorage member 43 of sheet-metal or the like which extends forwardly beyond and underneath the rear or inner end 35 of the shank 32. The rear-end 41 is provided with a pair of small holes 42-a whereby it can be fastened to the panel 22 adjacent the innermost end of the loop or compartment 20 by a pair of rivets 42.

The front-end of the member 43 is provided with a pair of integrally-formed stop ears 45 which extend transversely therefrom and are bent over so as to overlie and enclose the transverse edges of the shank 32, whereby the member 43 and the shank 32 are maintained in face-to-face or side-by-side sliding relationship. The spring 39 is disposed in juxtaposed side-by-side relationship to the anchorage member 43.

The elongated intermediate portion 70 of the member 43 is pressed outward as at 71 along one side thereof so as to strengthen the elongated member and also to provide a longitudinally extending groove 72 within which the spring 39 is partially recessed so as to minimize the extent to which the spring protrudes beyond said member 43. Thus, the groove 72 may have a transverse dimension of approximately one-fourth to one-half the circumference of the spring so that a corresponding part of the spring is more or less enclosed thereby.

The ears 45 serve to limit the outward movement of the shank 32 (when a pull is applied to the buckle so as to stretch the spring 39) since they lie in the path of the stop-shoulders 37. It is apparent that, when the pull on the buckle is released, the spring 39 will operate to retract the connector member 30 and to return it from the fully-extended position shown in Figure 3 to the fully-retracted position shown in Figure 2.

When the trouser belt of the present invention is worn with the other end 46 of the strap 19 (shown in dash-dot lines in Figure 1) passed through the buckle 26 (with the buckle-tongue 27 inserted into one of the holes 47 formed adjacent the end 46) and inserted within the retaining loop 48 set into the loop 20 near the inner end thereof, there will be a tendency for the buckle 26 to be pulled out to some extent due to the fact that the trouser-belt is usually worn somewhat tightened. It is a simple matter to adjust the point at which the buckle will "give" under the proper pulling force affording the greatest comfort to the wearer.

In other words, the spring should not be too strong since this would require the belt to be tightened excessively before the spring-action comes into effect and, accordingly, would render the belt uncomfortable.

On the other hand, the spring should not be too weak since this would cause the buckle and connector to be pulled all the way out to the fully-extended position shown in Figure 3 before the belt was tightened sufficiently to permit it to function properly and, as a result, the resilience would be lost. Thus, when the belt is worn normally, the buckle and connector are in the partially-extended position shown in Figure 1 wherein the spring provides a resilient connector which "gives" with the movements of the wearer to provide maximum comfort.

In assembling the novel trouser-belt construction of Figure 1, the buckle 26, connector member 30, spring 39 and member 43 are first pre-assembled as a more or less integral unit.

The slot 33 may then be formed transversely along the strap 19 along a line which will subsequently become the fold-line 34. The pre-assembled unit (namely the buckle 26 plus the connector-member 30 plus the spring 39 plus the attachment-and-stop-member 43) is then inserted through the slot 33 and the retaining loop 48 and the rivets 42 affixed.

Thereafter, the stitching 23—24—25 is applied to complete the formation of the closed loop or compartment 20.

From the foregoing, it is evident that the assembly operation is greatly simplified and that labor cost is greatly reduced, inasmuch as the pre-assembled unit can be inexpensively made up elsewhere and affixed to the belt in a fraction of the time otherwise required in resilient-buckle constructions of the types heretofore employed.

In addition to serving as stop-members, the ears 45 function as a guide for the shank, minimizing transverse movement thereof and reducing wear on the slot 33.

Inasmuch as the elongated member 43 lies intermediate the helical spring 39 on the one hand and the rear-panel 22 and the retaining-loop 48 on the other hand, it serves as a shield so as to eliminate friction which would otherwise be present when the spring expands and contracts relative to the rear panel 22. In this way, binding of the spring is minimized thereby insuring easier and more responsive spring-action.

Inasmuch as the upturned stop-shoulders 37 serve to space the front panel 21 somewhat away from the spring 39, there is relatively little friction between the spring and the front panel and, accordingly, it has been found unnecessary to provide a similar protecting shield on the top or outer side of said spring.

In Figure 6 there is shown a modified form of the embodiment of Figures 1–5 wherein the integral one-piece member 43 is replaced by a three-piece attachment-and-stop-unit 50 made up of an attachment plate 51, a stop-member 52 having bent-over ears 53 similar to the ears 45 described hereinabove, and an elongated connecting strip 54 of flexible material (as for example syinthetic plastic or the like) having its ends looped through slots 55 and 56 formed in the attachment plate 51 and the stop-member 52 respectively; the looped ends of the connecting strip 54 being then stitched as at 57-a and 57-b to provide a more or less unitary structure which provides stop-action for the shank 32 and which provides a somewhat greater degree of comfort by replacing the less flexible metal of the member 43 by the elongated flexible connecting strip 54.

Instead of being constructed of fully flexible material like synthetic plastic, the connecting strip 54 may be made of very thin metal, as for example ribbon steel, which can be bent freely in the horizontal plane but which resists vertical or transverse displacement so that it tends to maintain the stop-member 53 against up or down displacement and thereby aids in maintaining the shank of the connector member generally in alignment with the slot in the fold-line of the belt.

Of course where ribbon steel is employed, the stitching 57-a and 57-b is replaced by riveting, spot-welding or other conventional means of attachment.

The method of assembly of the embodiment of Figure 6 is generally the same as that described hereinabove in connection with Figures 1–5. That is, the buckle 26, the connector member 30, the spring 39, and the member 50 can first be pre-assembled as a unit which can thereafter be installed upon the belt by inserting it through the slot 33 in the fold-line and riveting the attachment plate 51 to the rear panel 22 in the manner described hereinabove.

In Figures 7–9, there is shown another embodiment which generally resembles that of Figures 1–5 except that member 43-a does not have the groove 72 and, instead, is a generally thin flat member throughout as indicated particularly in Figure 9. Additionally, this embodiment, instead of having stop-ears 45, is provided with a rivet 58 extending upwardly or outwardly adjacent its forward end and except that the shank 32-a is provided with a longitudinally extending slot 59 through which the rivet 58 extends in a manner similar to that disclosed in my co-pending application Serial No. 39,444.

A washer 60 is maintained upon the stem of the rivet 58, adjacent the outer surface of the shank 32-a by the enlarged head 61 of said rivet 58.

The rivet 58 may be firmly affixed to the front end of the member 43-a in any appropriate conventional manner so that the shank 32-a is free to move longitudinally while being restrained against appreciable horizontal or vertical displacement. It is obvious that the outward movement of the shank 32-a will be limited to the point at which the inner end 59-a of the slot 59 strikes the stem of the rivet 58 while the inward movement of the shank will be limited to the point at which the outer end of 59-a of the slot 59 strikes the stem of the rivet 58.

The method of assembly and the mode of operation of this embodiment are generally the same as described hereinabove.

In Figures 10 and 11 there is shown a modified form of the embodiment of Figures 7–9 wherein the rivet 58 is eliminated and, instead, the front end of the member 43-b is provided with a pair of integrally-formed lugs 62 which are bent so as to extend outwardly and through the slot 59 and are then bent over transversely to provide retaining shoulders 63 on the outer side of the shank 32-a.

The lugs 62 cooperate with the slot 59 to limit the movement of the shank in the same manner as described in connection with the embodiment of Figures 7–9.

It is obvious that various modifications of the structure described hereinabove could be made.

Thus, for example, the ears 45 of Figure 1 and the ears 53 of Figure 6 could be modified or replaced in a manner analogous to the various embodiments of my co-pending application Serial No. 18,398.

Similarly, the forms of stop-members shown in Figures 7–9 and 10 could be modified as suggested in my co-pending application Serial No. 39,444.

It is also obvious that the ears 53 of the stop-member 52 could be replaced by the rivet of Figure 7 or the lugs of Figure 10, cooperating with an appropriate slot formed in the shank of the connector.

Furthermore, the member 43-a of Figures 7–9 could be provided with a longitudinally extending groove as in the embodiment of Figures 1–5 and, conversely, the member 43 of Figures 1–5 could be constructed as a thin, flat member, without the groove 72.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described my invention, I claim as new and desire to protect by Letters Patent:

1. For use with a flexible garment-supporting belt or the like having one end folded inwardly and peripherally stitched to provide a generally enclosed compartment having front and rear panels and having a slot formed along the fold-line; a resilient and expansible mounting for a buckle or the like comprising a connector constructed and arranged to support said buckle and having an elongated shank extending through said slot and within said compartment, an elongated member disposed entirely within said compartment and having one end fixedly connected to one of said panels adjacent the inner end of said compartment, said elongated member being disposed at least in part in side-by-side sliding relationship with said shank, said elongated member and said shank being maintained in side-by-side juxtaposed relationship by a pair of ears formed on one of them and bent so as to overlie the other, and a helical spring operatively connected intermediate said elongated member and said shank and constructed and arranged yieldably to urge said shank inwardly relative to said slot, said elongated member having a longitudinally extending groove formed therein, said helical spring being disposed in said groove.

2. For use with a flexible garment-supporting belt or the like having one end folded inwardly and peripherally stitched to provide a generally enclosed compartment having front and rear panels and having a slot formed along the fold-line; a resilient and expansible mounting for a buckle or the like comprising a connector constructed and arranged to support said buckle and having an elongated shank extending through said slot and within said compartment, an elongated member disposed entirely within said compartment and having one end fixedly connected to one of said panels adjacent the inner end of said compartment, said elongated member being disposed at least in part in side-by-side sliding relationship with said shank, said elongated member and said shank being maintained in side-by-side juxtaposed relationship by a pair of ears formed on one of them and bent so as to overlie the other, a helical spring operatively connected intermediate said elongated member and said shank and constructed and arranged yieldably to urge said shank inwardly relative to said slot, said elongated member having a longitudinally extending groove formed therein, said helical spring being disposed in said groove, and cooperating stop-means constructed and arranged to limit the outward movement of said shank relative to said elongated member.

3. For use with a flexible garment-supporting belt or the like having one end folded inwardly and peripherally stitched to provide a generally enclosed compartment having front and rear panels and having a slot formed along the fold-line; a resilient and expansible mounting for a buckle or the like comprising a connector constructed and arranged to support said buckle and having an elongated shank extending through said slot and within said compartment, an elongated member disposed entirely within said compartment and having one end fixedly connected to one of said panels adjacent the inner end of said compartment, said elongated member extending in side-by-side relationship to said shank, means maintaining said shank in juxtaposed side-by-side sliding relationship to the outer end of said elongated member, and a helical spring operatively connected intermediate said elongated member and said shank and constructed and arranged yieldably to urge said shank inwardly relative to said slot, said elongated member having a longitudinally-extending groove formed therein and said helical spring being disposed in said groove.

4. For use with a flexible garment-supporting belt or the like having one end folded inwardly and peripherally stitched to provide a generally enclosed compartment having front and rear panels and having a slot formed along the fold-line; a resilient and expansible mounting for a buckle or the like comprising a connector constructed and arranged to support said buckle and having an elongated shank extending through said slot and within said compartment, an elongated member disposed entirely within said compartment and having one end fixedly connected to one of said panels adjacent the inner end of said compartment, said elongated member extending in side-by-side relationship to said shank, means maintaining said shank in juxtaposed side-by-side sliding relationship to the outer end of said elongated member, and a helical spring operatively connected intermediate said elongated member and said shank and constructed and arranged yieldably to urge said shank inwardly relative to said slot, said elongated member having a longitudinally extending groove formed therein, said helical spring being disposed in said groove, and said shank having a stop-shoulder formed at its inner end and constructed and arranged to limit the outward movement of said connector.

5. For use with a flexible garment-supporting belt or the like having one end folded inwardly and peripherally stitched to provide a generally enclosed compartment having front and rear panels and having a slot formed along the fold-line; a resilient and expansible mounting for a buckle or the like comprising a connector constructed and arranged to support said buckle and having an elongated generally flat sheet-metal shank extending through said slot and within said compartment, an elongated generally flat sheet-metal anchorage member disposed entirely within said compartment and having one end fixedly connected to one of said panels adjacent the inner end of said compartment, said elongated anchorage member extending in face-to-face relationship to said shank, means for maintaining said shank in face-to-face sliding relationship with said elongated anchorage member, and a helical spring operatively interposed between the inner end of said shank and an end of said anchorage member and in juxtaposed side-by-side relationship to said elongated anchorage member.

6. For use with a flexible garment-supporting belt or the like having one end folded inwardly and peripherally stitched to provide a generally enclosed compartment having front and rear panels and having a slot formed along the fold-line; a resilient and expansible mounting for a buckle or the like comprising a connector constructed and arranged to support said buckle and having an elongated generally flat sheet-metal shank extending through said slot and within said compartment, an elongated generally flat sheet-metal anchorage member disposed entirely within said compartment and having one end fixedly connected to one of said panels adjacent the inner end of said compartment, said elongated anchorage member extending in face-to-face relationship to said shank, means for maintaining said shank in face-to-face sliding relationship with said elongated anchorage member, and a helical spring operatively interposed between the inner end of said shank and an end of said anchorage member and extending in juxtaposed side-by-side relationship to said elongated anchorage member, said elongated anchorage member being provided with a longitudinal extending groove and said helical spring being disposed in said groove.

7. For use with a flexible garment-supporting belt or the like having one end folded inwardly and peripherally stitched to provide a generally enclosed compartment having front and rear panels and having a slot formed along the fold-line; a resilient and expansible mounting for a buckle or the like comprising a connector constructed and arranged to support said buckle and having an elongated shank extending through said slot and within said compartment, an elongated member disposed entirely within said compartment and having one end fixedly connected to one of said panels adjacent the inner end of said compartment, said elongated member extending in side-by-side relationship to said shank, means for maintaining said shank in side-by-side sliding relationship with the outer end of said elongated member, said last-mentioned means comprising a pair of ears formed at the outer end of said elongated member and bent so as to overlie said shank, and a helical spring connected to the inner end of said shank and extending inwardly therefrom in juxtaposed side-by-side relationship to said elongated member, with the other end of said spring connected to the inner end of said elongated member.

8. For use with a flexible garment-supporting belt or the like having one end folded inwardly and peripherally stitched to provide a generally enclosed compartment having front and rear panels and having a slot formed along the fold-line; a resilient and expansible mounting for a buckle or the like comprising a connector constructed and arranged to support said buckle and having an elongated shank extending through said slot and within said compartment, an elongated member disposed entirely within said compartment and having one end fixedly connected to one of said panels adjacent the inner end of said compartment, said elongated member extending in side-by-side relationship to said shank, means for maintaining said shank in side-by-side sliding relationship with the outer end of said elongated member, said last-mentioned means comprising a rivet mounted at the outer end of said elongated member and extending through a longitudinally extending slot formed in said shank, and a helical spring connected to the inner end of said shank and extending inwardly therefrom in juxtaposed side-by-side relationship to said elongated member, with the other end of said spring connected to the inner end of said elongated member.

9. For use with a flexible garment supporting belt or the like having one end folded inwardly and peripherally stitched to provide a generally enclosed compartment having front and rear panels and having a slot formed along the fold-line; a resilient and expansible mounting for a buckle or the like comprising a connector constructed and arranged to support said buckle and having an elongated shank extending through said slot and within said compartment, an elongated member disposed entirely within said compartment and having one end fixedly connected to one of said panels adjacent the inner end of said compartment, said elongated member extending in side-by-side relationship to said shank, means for maintaining said shank in side-by-side sliding relationship with the outer end of said elongated member, said last-mentioned means comprising a pair of shoulders formed at the outer end of said elongated member and passing through a longitudinally extending slot formed in said shank, and a helical spring connected to the inner end of said shank and extending inwardly therefrom in juxtaposed side-by-side relationship to said elongated member, with the other end of said spring connected to the inner end of said elongated member.

*10. For use with a flexible garment-supporting belt or the like having one end folded inwardly and peripherally stitched to provide a generally enclosed compartment having front and rear panels separated by a fold-line, said compartment having an opening formed therein generally on the fold-line; a resilient and expansible mounting for a buckle or the like comprising a connector constructed and arranged to support said buckle and having an elongated shank, an elongated member disposed entirely within said compartment and having one end fixedly connected to one of said panels adjacent the inner end of said compartment, said elongated member being disposed at least in part in side-by-side sliding relationship with said shank, said elongated member and said shank being maintained in side-by-side juxtaposed relationship by a pair of ears formed on one of them and bent so as to overlie the other, and a helical spring operatively connected intermediate said elongated member and said shank and constructed and arranged yieldably to urge said connector-and-buckle inwardly relative to said opening, said elongated member having a longitudinally extending groove formed therein, said helical spring being disposed in said groove.*

*11. For use with a flexible garment-supporting belt or the like having one end folded inwardly and peripherally stitched to provide a generally enclosed compartment having front and rear panels separated by a fold-line and having an opening disposed generally on the fold-line; a resilient and expansible mounting-and-buckle assembly comprising a buckle disposed at least in part outside said compartment and generally adjacent said fold-line, and a mounting for said buckle, said mounting com-*

*prising an elongated anchorage member of sheet-metal or the like disposed entirely within said compartment and having its inner end permanently and immovably fastened to one of said panels, a connector of sheet-metal or the like having means at its outer end pivotally holding the buckle and having an elongated shank, means for maintaining said shank in face-to-face sliding relationship with said elongated anchorage member, and a helical spring operatively interposed between the inner end of said shank and one end of said anchorage member, said spring being constructed and arranged yieldably to urge the inner end of said shank toward the inner end of said anchorage member.*

*12. A construction according to claim 11 wherein the outer end of the connector is provided with a pair of laterally-spaced sleeves constructed and arranged to encircle the rear bar of the buckle on either side of the buckle-tongue so as to permit pivotal movement of the*

*buckle and wherein the anchorage member is provided with a longitudinally-extending groove within which the helical spring is partly recessed and wherein the anchorage member and the shank are maintained in face-to-face sliding relationship by a pair of ears integrally formed on one of them and bent so as to overlie the other.*

LLOYD H. EASLICK.

REFERENCES CITED

The following references are of record in the file of this patent or the original patent:

UNITED STATES PATENTS

| Number | Name | Date |
|---|---|---|
| 1,367,481 | Jansen | Feb. 1, 1921 |
| 1,524,616 | Erpenbeck | Jan. 27, 1925 |
| 1,594,962 | Jacobs | Aug. 3, 1926 |
| 2,415,254 | Lutz et al. | Feb. 4, 1947 |